(12) United States Patent
Jang et al.

(10) Patent No.: US 8,920,685 B2
(45) Date of Patent: Dec. 30, 2014

(54) NANOPARTICLE-RESIN COMPOSITION, NANOPARTICLE-RESIN COMPOSITE, AND METHOD OF MAKING NANOPARTICLE-RESIN COMPOSITE

(75) Inventors: Eun-Joo Jang, Suwon-si (KR); Shin-Ae Jun, Seongnam-si (KR); Seok-Hwan Hong, Seoul (KR); Jin-Young Bae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 853 days.

(21) Appl. No.: 12/979,773

(22) Filed: Dec. 28, 2010

(65) Prior Publication Data

US 2011/0240931 A1 Oct. 6, 2011

(30) Foreign Application Priority Data

Apr. 1, 2010 (KR) ........................ 10-2010-0030137

(51) Int. Cl.
*H01B 1/04* (2006.01)
*B82Y 30/00* (2011.01)
*H01B 1/22* (2006.01)

(52) U.S. Cl.
CPC .. *H01B 1/22* (2013.01); *B82Y 30/00* (2013.01)
USPC .................. 252/519.31; 252/512; 252/519.3; 524/428; 524/430; 524/432

(58) Field of Classification Search
CPC .............. H01B 1/02; H01B 1/04; H01B 1/20; H01B 1/22; H01B 1/24; B82Y 30/00; C09D 133/02; C09D 189/00
USPC ................. 252/512, 513, 514, 518.1, 519.14, 252/520.3, 521.2, 521.3, 519.3, 519.31; 524/428, 430, 432
See application file for complete search history.

(56) References Cited

U.S. PATENT DOCUMENTS

| | | | |
|---|---|---|---|
| 7,226,966 B2 * | 6/2007 | Kambe et al. | ................. 524/432 |
| 2004/0262583 A1 | 12/2004 | Lee | |
| 2007/0055039 A1 | 3/2007 | Usui | |
| 2008/0277626 A1 | 11/2008 | Yang | |
| 2009/0034930 A1 | 2/2009 | Chen | |
| 2010/0174024 A1 * | 7/2010 | Du et al. | ....................... 524/428 |

FOREIGN PATENT DOCUMENTS

KR 1020060085668 A 7/2006

OTHER PUBLICATIONS

"Enhanced Fluorescence Intermittency of CdSe—ZnS Quantum-Dot Clusters," Ming Yu and Alan Van Orden, Physical Rev. Lett., 2006, vol. 97, pp. 237402-1 to 237402-4; (Received Jun. 23, 2006; published Dec. 8, 2006), PRL 97, 237402 (2006).

"Induction of Smectic Layering in Nematic Liquid Crystals Using Immiscible Components. 2. Laterally attached side-chain liquid crystalline poly(norbornene)s and their low-molar-mass analogues with Hydrocarbon/Olivodimthylsiloxane Substituents" Coleen Pugh, Jin-Young Bae, Jayesh Dharia, Jason J. Ge, and Stephen Z. D. Cheng, Macromolecules 1998, 31,5188-520.

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

A nanoparticle-resin composition includes a nanoparticle, a silicone resin having a reactive functional group at its terminal end, and a compound selected from a silane group-containing compound, a silazane compound, or a combination including at least one of the foregoing. In addition, a nanoparticle-resin composite includes a silicone resin matrix including the cure product of a silicone resin having a reactive functional group at its terminal end, a plurality of nanoparticle clusters dispersed in the silicone resin matrix, and a buffer layer encapsulating the nanoparticle cluster. The buffer layer includes a compound selected from a silane group-containing compound, a silazane compound, or a combination including at least one of the foregoing compounds.

15 Claims, 8 Drawing Sheets

NANOPARTICLE-RESIN COMPOSITION, NANOPARTICLE-RESIN COMPOSITE, AND METHOD OF MAKING NANOPARTICLE-RESIN COMPOSITE

CROSS-REFERENCE TO RELATED APPLICATION

This application claims priority to Korean Patent Application No. 10-2010-0030137 filed on Apr. 1, 2010, and all the benefits accruing therefrom under 35 U.S.C. 119, the content of which in its entirety is herein incorporated by reference.

BACKGROUND

1. Field

This disclosure relates to a nanoparticle-resin composition, nanoparticle-resin composite, and a method of manufacturing the same.

2. Description of the Related Art

Semiconductor nanoparticles, also referred to as quantum dots, are semiconductor materials with a nano-sized (generally <100 nm) dimensions and a crystalline structure, and can include from hundreds to thousands of atoms.

Since semiconductor nanoparticles are very small, they have a large surface area per unit volume, and also exhibit quantum confinement effects. Accordingly, they have unique physicochemical characteristics based on their size, that differ from inherent characteristics of corresponding bulk semiconductor materials.

Since optoelectronic properties of nanoparticles may be controlled by adjusting their size, the semiconductor nanoparticles remain the object of active research as applied to, for example, display devices and bio applications.

Moreover, the semiconductor nanoparticle does not contain a heavy metal, and therefore has other advantages such as environmental-friendliness and that it is safe for human contact. Therefore, there has been much interest in development of diverse technologies for synthesizing semiconductor nanoparticles exhibiting such characteristics and applicability to diverse areas of technology, by controlling the size, structure, uniformity, and so forth thereof.

Semiconductor nanoparticles, when used in a display device however, further require increased stability, luminous efficacy, color purity, lifetime, and other such properties.

SUMMARY

One or more embodiments include a nanoparticle-resin composition and a nanoparticle-resin composite particle having excellent stability, device efficiency, and lifetime.

One or more embodiments include a method of preparing the nanoparticle-resin composite efficiently.

One or more embodiments include a light emitting device including the nanoparticle-resin composition or a nanoparticle-resin composite.

One or more embodiments include a nanoparticle-resin composition including a nanoparticle, a silicone resin having a reactive functional group at its terminal end, and a compound selected from a silane group-containing compound, a silazane compound, or a combination comprising at least one of the foregoing.

One or more embodiments include a nanoparticle-resin composite including a silicone resin matrix including the cure product of a silicone resin having a reactive functional group at its terminal end, a plurality of nanoparticle clusters dispersed in the silicone resin matrix, and a buffer layer encapsulating the nanoparticle cluster. The buffer layer includes a compound selected from a silane group-containing compound, a silazane compound, or a combination comprising at least one of the foregoing.

The nanoparticle may be selected from a semiconductor nanoparticle, a metal nanoparticle, a metal oxide nanoparticle, or a combination comprising at least one of the foregoing.

The semiconductor nanoparticle may be selected from a group II-VI compound, a group III-V compound, a group IV-VI compound, a group IV compound, or a combination comprising at least one of the foregoing.

The metal nanoparticle may be selected from palladium (Pd), platinum (Pt), nickel (Ni), cobalt (Co), rhodium (Rh), iridium (Ir), iron (Fe), ruthenium (Ru), gold (Au), silver (Ag), copper (Cu), or a combination comprising at least one of the foregoing.

The metal oxide nanoparticle may include oxides of a metal selected from silicon (Si), titanium (Ti), cobalt (Co), tin (Sn), aluminum (Al), zinc (Zn), indium (In), zirconium (Zr), nickel (Ni), hafnium (Hf), vanadium (V), or a combination comprising at least one of the foregoing.

The silicone resin having a reactive functional group at its terminal end may be represented by the following Chemical Formula 1.

Chemical Formula 1

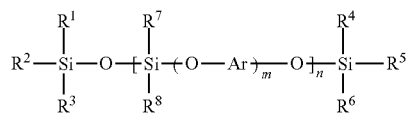

In Chemical Formula 1, $R^1$ to $R^6$ are the same or different, and are selected from hydrogen, a substituted or unsubstituted C1 to C30 alkyl group, a substituted or unsubstituted C6 to C30 aryl group, a substituted or unsubstituted C6 to C30 heteroaryl group, a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth)acrylate, a halogen, —ROR' (wherein R is a substituted or unsubstituted alkylene group and R' is hydrogen or a C1 to C30 alkyl group), an acyl halide, —RCOX (wherein R is a substituted or unsubstituted C1 to C30 alkylene group and X is a halogen), or —RCOOR' (wherein R is a substituted or unsubstituted C1 to C30 alkylene group, or R' is hydrogen or a C1 to C30 alkyl group), provided at least one of $R^1$ to $R^3$ and at least one of $R^4$ to $R^6$ are selected from a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth)acrylate; a halogen, —ROR' (wherein R is a substituted or unsubstituted C1 to C30 alkylene group and R' is hydrogen or a C1 to C30 alkyl group), an acyl halide, —RCOX (wherein R is a substituted or unsubstituted C1 to C30 alkylene group and X is a halogen), or —RCOOR' (wherein R is a substituted or unsubstituted C1 to C30 alkylene group, and R' is hydrogen or a C1 to C30 alkyl group);

$R^7$ and $R^8$ are the same or different, and are selected from hydrogen, a substituted or unsubstituted C1 to C30 alkyl group, a substituted or unsubstituted C6 to C30 aryl group, or a substituted or unsubstituted C6 to C30 heteroaryl group;

Ar is selected from a substituted or unsubstituted C6 to C30 arylene group or a substituted or unsubstituted C6 to C30 heteroarylene group;

m is 0 or 1; and n is an integer of from 2 to 30.

The silicone resin having a reactive functional group at its terminal end has viscosity ranging from about 10 to about 20,000 cps.

The silicone resin having a reactive functional group at its terminal end may be included in an amount of about 5 to about 1,000 parts by weight based on 100 parts by weight of the nanoparticle.

The silane group-containing compound may be represented by the following Chemical Formula 2.

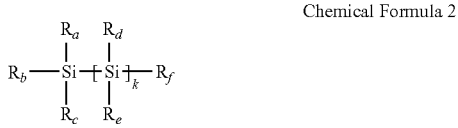

Chemical Formula 2

In Chemical Formula 2, $R_a$ to $R_f$ is selected from hydrogen, a substituted or unsubstituted C1 to C30 alkyl group, a substituted or unsubstituted C1 to C30 alkoxy group, a substituted or unsubstituted C6 to C30 aryl group, or a substituted or unsubstituted C6 to C30 heteroaryl group, provided that at least one of $R_a$ to $R_f$ is hydrogen; and k is an integer of from 0 to 5.

The silazane compound may be represented by the following Chemical Formula 3.

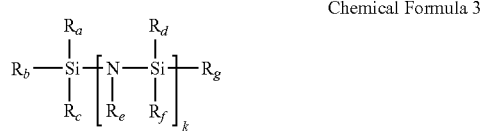

Chemical Formula 3

In Chemical Formula 3, $R_a$ to $R_g$ is selected from hydrogen, a substituted or unsubstituted C1 to C30 alkyl group, a substituted or unsubstituted C1 to C30 alkoxy group, a substituted or unsubstituted C6 to C30 aryl group, a substituted or unsubstituted C6 to C30 heteroaryl group, or NR, where R is hydrogen or a C1 to C10 alkyl group;

k is an integer of from 1 to 10; and when k is 4 or more, $R_b$ and $R_g$ are linked to each other to form a ring.

The compound selected from a silane group-containing compound, a silazane compound, or a combination thereof may be included in an amount of about 5 to about 1,000 parts by weight based on 100 parts by weight of the nanoparticle.

The nanoparticle-resin composition may further include an alkane compound of C16 or more or an alkene compound of C16 or more.

The silicone resin matrix may include a cross-linked polymer of the silicone resin of Chemical Formula 1.

The buffer layer may include a first portion contacting the nanoparticle cluster and a second portion contacting the silicone resin matrix, and the compound selected from a silane group-containing compound, a silazane compound, or a combination comprising at least one of the foregoing may be present at a concentration gradient from the first portion to the second portion.

The compound selected from a silane group-containing compound, a silazane compound, or a combination comprising at least one of the foregoing may be present so that a concentration ratio of the first and second portions has a mole ratio of about 1:5 to 20.

The buffer layer may further include an alkane compound of C16 or more or an alkene compound of C16 or more.

In one or more embodiments, a method of preparing a nanoparticle-resin composite is provided. The method for preparing includes providing a nanoparticle-resin composition by combining a nanoparticle, a silicone resin having a reactive functional group at its terminal end, and a compound selected from a silane group-containing compound, a silazane compound, or a combination comprising at least one of the foregoing, and curing the silicone resin to provide a silicone resin matrix encapsulating a nanoparticle cluster, wherein a buffer layer is interposed between the nanoparticle cluster and silicone resin matrix. The buffer includes a compound selected from a silane group-containing compound, a silazane compound, or a combination comprising at least one of the foregoing.

Also, in one or more embodiments, a device including the nanoparticle-resin composite is provided.

The above and other embodiments will be described in the following detailed description.

DETAILED DESCRIPTION

Figure 1:
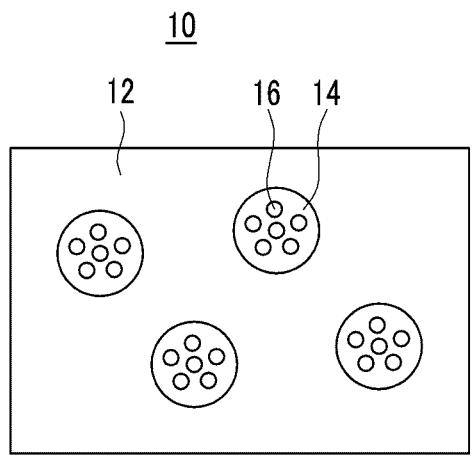
FIG. 1 is a schematic view showing a nanoparticle-resin composition according to an embodiment.

This disclosure will be described more fully hereinafter in the following detailed description of this disclosure, in which some but not all embodiments of this disclosure are described. This disclosure may be embodied in many different forms and is not be construed as limited to the embodiments set forth herein; rather, these embodiments are provided so that this disclosure will satisfy applicable legal requirements.

As used herein, "Alkyl" refers to a straight or branched chain saturated aliphatic hydrocarbon having the specified number of carbon atoms. "Alkenyl" is a straight or branched chain hydrocarbon that comprises at least one carbon-carbon double bond. "Alkoxy" refers to an alkyl moiety that is linked via an oxygen (i.e., —O-alkyl). Nonlimiting examples of C1 to C30 alkoxy groups include methoxy groups, ethoxy groups, propoxy groups, isobutyloxy groups, sec-butyloxy groups, pentyloxy groups, iso-amyloxy groups, and hexyloxy groups. The term "alkylene" refers to a straight, branched or cyclic divalent aliphatic hydrocarbon group. The term "alkynyl" refers to a straight or branched chain hydrocarbon that has one or more unsaturated carbon-carbon bonds, at least one of which is a triple bond. As used herein "amide" generally refers to the group —C(O)NRR, wherein each R is independently hydrogen, a C1 to C6 alkyl, or a C6 to C12 aryl. As used herein "amine" has the general formula NRR, wherein each R is independently hydrogen, an alkyl group, or an aryl group. As used herein "aryl," means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof. An "arylalkylene" group is an aryl group linked via an alkylene moiety. The specified number of carbon atoms (e.g., C7 to C30) refers to the total number of carbon atoms present in both the aryl and the alkylene moieties. Representative arylalkyl groups include, for example, benzyl groups. As used herein, "arylalkyl" refers to an alkylene group in which one of the hydrogen atoms of the alkylene is replaced by an aryl group. As used herein, the term "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic. "Aryloxy" refers to an aryl moiety that is linked via an oxygen (i.e., —O-aryl). "Cycloalkylene" refers to a divalent radical formed by the removal of two hydrogen atoms from one or more rings of a cycloalkyl group (a nonaromatic hydrocarbon that comprises at least one ring). A "heteroalkyl" group is an alkyl group that comprises at least one heteroatom covalently bonded to one or more carbon atoms of the alkyl group. A "heteroaryl" group is a monovalent carbocyclic ring system that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. A "heteroarylalkyl" group is a heteroaryl group linked via an alkylene moiety. The specified number of carbon atoms (e.g., C3 to C30) refers to the total number of carbon atoms present in both the aryl and the alkylene moieties, with remaining ring atoms being heteroatoms as discussed above. "Heteroarylene" refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic. As used herein, "combination" is inclusive of blends, mixtures, alloys, reaction products, and the like.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness of layers, films, panels, regions, or the like, are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to one substituted with a substituent selected from a C1 to C30 alkyl group, a C2 to C30 alkynyl group, a C6 to C30 aryl group, a C7 to C30 alkylaryl group, a C1 to C4 oxyalkyl group, a C1 to C30 heteroalkyl group, a C3 to C30 heteroalkylaryl group, a C3 to C30 alicyclic group, a C3 to C15 cycloalkenyl group, a C6 to C30 cycloalkynyl group, a C2 to C30 heterocycloalkyl group, a halogen (F, Cl, Br, or I), a hydroxyl group, a C1 to C30 alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid or a salt thereof, phosphoric acid or a salt thereof, or a combination comprising at least one of the foregoing.

As used herein, when a definition is not otherwise provided, the term "hetero" may refer to one including 1 to 3 heteroatoms selected from N, O, S, Si, or P.

As used herein, the term "alicyclic group" may refer to a C3 to C30 cycloalkyl group, a C3 to C30 cycloalkenyl group, or a C3 to C30 cycloalkynyl group.

As used herein, the term "combination thereof" refers to a mixture, a stacked structure, a composite, an alloy, or the like. Also as used herein, the term "combination (or mixture) comprising at least one of the following" refers to the presence of one or more of the recited elements with or without additional elements not recited in the recited group.

As used herein, (meth)acrylate refers to an acrylate or a methacrylate.

In an embodiment, a nanoparticle-resin composition includes a nanoparticle, a silicone resin having a reactive functional group at its terminal end, and a compound selected from a silane group-containing compound, a silazane compound, or a combination comprising at least one of the foregoing.

The semiconductor nanoparticle may be crystalline. When the semiconductor nanoparticle has crystallinity through its entire bulk, it may be a semiconductor nanocrystal. The semiconductor nanoparticle may be totally or partially amorphous. Useful semiconductor nanoparticles may include a Group II-VI compound, a Group III-V compound, a Group IV-VI compound, a Group IV compound, or a combination comprising at least one of the foregoing.

The Group II-VI compound includes a binary compound selected from CdSe, CdTe, ZnS, ZnSe, ZnTe, ZnO, HgS, HgSe, HgTe, MgSe, MgS, or a mixture comprising at least one of the foregoing; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture comprising at least one of the foregoing; or a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, or a mixture comprising at least one of the foregoing. The Group III-V compound includes a binary compound selected from GaN, GaP, GaAs, GaSb, AlN, AlP, AlAs, AlSb, InN, InP, InAs, InSb, or a mixture comprising at least one of the foregoing; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a mixture comprising at least one of the foregoing; or a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a mixture comprising at least one of the foregoing. The Group IV-VI compound includes a binary compound selected from SnS, SnSe, SnTe, PbS, PbSe, PbTe, or a mixture comprising at least one of the foregoing; a ternary element compound selected from SnSeS, SnSeTe, SnSTe, PbSeS, PbSeTe, PbSTe, SnPbS, SnPbSe, SnPbTe, or a mixture comprising at least one of the foregoing; or a quaternary element compound selected from SnPbSSe, SnPbSeTe, SnPbSTe, or a mixture comprising at least one of the foregoing. The Group IV compound includes a single-element compound selected from Si, Ge, and a mixture comprising at least one of the foregoing; or a binary compound selected from SiC, SiGe, or a mixture comprising at least one of the foregoing.

Herein, the binary compound, the ternary element compound, or the quaternary element compound may exist in a uniform concentration in a particle or may have different concentration distributions or gradient in the same particle. In addition, the nanoparticles may have a core/shell structure in which one semiconductor nanoparticle is surrounded by another semiconductor nanoparticle. The core and shell may have an interface in which an element in the shell has a gradient in lowered concentration from the surface to the center.

The semiconductor nanoparticle may have a particle diameter of from about 1 nm to about 100 nm, and in one embodiment, of from about 1 nm to about 10 nm. The particle may be spherical or aspherical, and the particle diameter may refer to the longest size where the semiconductor nanoparticle does not have a spherical shape. It will be understood that as used herein, "particle diameter" refers to the number averaged particle diameter, and may be determined by techniques such as, for example, static or dynamic light scattering (SLS or DLS, respectively). Combinations of nanoparticles having different particle diameters may be used.

In addition, the semiconductor nanoparticle may have no particular limit in shape, but may be spherical, pyramidal, or multi-armed, or may be a cubic nanoparticle, nanotube, nanowire, nanofiber, nanoplate particle, and the like. Combinations of nanoparticles of different shapes may be used.

In addition, a method of synthesizing the semiconductor nanoparticle according to one embodiment is not particularly limited, but may include any useful method in the related field. For example, a method of synthesizing a semiconductor nanoparticle may include, but is not limited to, the following method.

For example, a wet chemical process may be used to form a semiconductor nanoparticle having a nano-size or a distribution of several nano-sizes. Nanoparticles are formed by adding a precursor material to an organic solvent and/or ligand. During crystal growth, the organic solvent and/or organic ligand surrounds the surface of the semiconductor nanoparticle and controls growth of the crystal by a kinetic process of coordinating to and dissociating from the growing surface of the semiconductor nanoparticle.

In addition, the synthesized semiconductor nanoparticle may be prepared into a nanoparticle-resin composite including a resin matrix wherein nanoparticle is dispersed by mixing with a resin and curing the resin, so that it can be used in different applications. However, the semiconductor nanoparticle, when dispersed in a nanoparticle-resin composite, may have deteriorated efficiency. In addition, there may be interfacial stress between the semiconductor nanoparticle and the resin matrix. In order to mitigate this stress, the surface of the semiconductor nanoparticle can be surrounded with a compound selected from a silane group-containing compound, a silazane compound, or a combination including at least one of these, to form a domain which is phase-separated from the resin matrix. it is believed the phase-separation domain plays a role of protecting the nanoparticle and can prevent the nanoparticle from being damaged during the resin curing, and helps prevent agglomeration of the nanoparticles together into a single mass, by keeping the nanoparticles dispersed in the resin.

FIG. 1 is a schematic view showing a nanoparticle-resin composition according to one embodiment. Referring to FIG. 1, a nanoparticle-resin composition 10 includes nanoparticle 16 in a phase-separation domain 14 where the phase of a compound selected from a silane group-containing compound, a silazane compound, or a combination comprising at least one of the foregoing is separated from the phase of a silicone resin 12, having a reactive functional group at its terminal end.

The silicone resin having a reactive functional group at its terminal end may be represented by the following Chemical Formula 1.

Chemical Formula 1

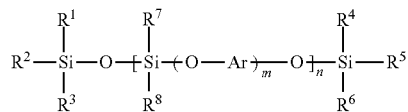

In Chemical Formula 1,
$R^1$ to $R^6$ are the same or different, and are selected from hydrogen, a substituted or unsubstituted C1 to C30 alkyl group, a substituted or unsubstituted C6 to C30 aryl group, a substituted or unsubstituted C6 to C30 heteroaryl group, a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth) acrylate, a halogen, —ROR' (Wherein R is a substituted or unsubstituted C1 to C30 alkylene group, and R' is hydrogen or a C1 to C30 alkyl group), an acyl halide, —RCOX (wherein R is a substituted or unsubstituted C1 to C30 alkylene group and X is a halogen), or —RCOOR' (wherein R is a substituted or unsubstituted C1 to C30 alkylene group, or R' is hydrogen or a C1 to C30 alkyl group), provided at least one of $R^1$ to $R^3$ and at least one of $R^4$ to $R^6$ are selected from a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth) acrylate, a halogen, —ROR' (wherein R is a substituted or unsubstituted C1 to C30 alkylene group and R' is hydrogen or a C1 to C30 alkyl group), an acyl halide, —RCOX (wherein R is a substituted or unsubstituted C1 to C30 alkylene group and X is a halogen), or —RCOOR' (wherein R is a substituted or unsubstituted C1 to C30 alkylene group and R' is hydrogen or a C1 to C30 alkyl group);

$R^7$ and $R^8$ are the same or different, and are selected from hydrogen, a substituted or unsubstituted C1 to C30 alkyl group, a substituted or unsubstituted C6 to C30 aryl group, or a substituted or unsubstituted C6 to C30 heteroaryl group;

Ar is selected from a substituted or unsubstituted C6 to C30 arylene group or a substituted or unsubstituted C6 to C30 heteroarylene group;

m is 0 or 1; and n is an integer of from 2 to 30.

In Chemical Formula 1, the alkenyl group may be a vinyl group or an allyl group.

The silicone resin having a reactive functional group at its terminal end may have viscosity of from about 10 to about 20,000 centipoise (cps) measured at 25° C., and in one embodiment, it may have a viscosity of from about 3,000 to about 10,000 cps. When the viscosity of the silicone resin is within this range, the silicone resin may readily be uniformly mixed with the nanoparticle.

The silicone resin having a reactive functional group at its terminal end may be included in an amount of about 5 to about 1,000 parts by weight based on 100 parts by weight of the nanoparticle. When it included within this range, the silicone resin may form a silicone resin matrix in which the nanoparticle is well dispersed.

The silane group-containing compound may be represented by the following Chemical Formula 2.

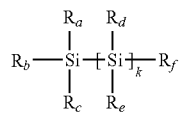

Chemical Formula 2

In Chemical Formula 2, $R_a$ to $R_f$ is selected from hydrogen, a substituted or unsubstituted C1 to to C30 alkyl group, a substituted or unsubstituted C1 to C30 alkoxy group, a substituted or unsubstituted C6 to C30 aryl group, or a substituted or unsubstituted C6 to C30 heteroaryl group, provided that at least one of $R_a$ to $R_f$ is hydrogen; and k is an integer of from 0 to 5.

Examples of the silane group-containing compound include a trialkylsilane such as trimethylsilane, triethylsilane, and the like; a trialkoxysilane such as triethoxysilane, trimethoxysilane, tributoxysilane, and the like; an aminosilane including an amine group; a vinylsilane including a vinyl group; an epoxy silane including an epoxy group; a phenylsilane including a phenyl group; or a chloro silane such as dimethyldichlorosilane, methyldichlorosilane, methyltrichlorosilane, phenyltrichlorosilane, trichlorosilane, trimethylchlorosilane, silicon tetrachloride, vinyltrichlorosilane, and the like. The alkyl may be a C1 to C20 alkyl.

The silazane compound may be represented by the following Chemical Formula 3.

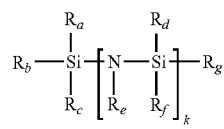

Chemical Formula 3

In Chemical Formula 3, $R_a$ to $R_g$ is hydrogen, a substituted or unsubstituted C1 to C30 alkyl group, a substituted or unsubstituted C1 to C30 alkoxy group, a substituted or unsubstituted C6 to C30 aryl group, a substituted or unsubstituted C6 to C30 heteroaryl group, or NR (wherein R is hydrogen or a C1 to C10 alkyl group);

k is an integer of from 1 to 10; and when k is 4 or more, $R_b$ and $R_g$ are linked to each other to form a ring. It will be understood that where a ring is present, one or neither of $R_b$ or $R_g$ may represent a single bond, and one or both of $R_b$ or $R_g$ may represents a substituted or unsubstituted C1 to C30 alkylene group, a substituted or unsubstituted C1 to C30 alkoxylene group, a substituted or unsubstituted C6 to C30 arylene group, a substituted or unsubstituted C6 to C30 heteroarylene group, or NR (wherein R is hydrogen or a C1 to C10 alkyl or alkylene group).

Examples of the silazane compound include hexamethyldisilazane, nonamethyltrisilazane, octyltricyclotetrasilazane, 1,3-bis (4-biphenyl)tetramethyldisilazane, 1,3-bis(trifluoropropyl)tetramethyldisilazane, 1,3-di-n-butyltetramethyldisilazane, 1,1-dimethylcyclosilazane, 1,3-di-n-octyltetramethyldisilazane, 1,3-diphenyltetramethyldisilazane, 1,3-di-n-propyltetramethyldisilazane, and the like. Combinations comprising at least one of the foregoing may also be used.

The compound selected from a silane group-containing compound, a silazane compound, or a combination comprising at least one of the foregoing may be used in an amount of about 5 to about 1,000 parts by weight based on 100 parts by weight of the nanoparticle. When used within this range, it is possible to form a buffer layer for alleviating interface stress that the nanoparticle may be subject to.

The nanoparticle-resin composition may further include an alkane compound of C16 or more or an alkene compound of C16 or more. The alkane compound of C16 or more or the alkene compound of C16 or more may have a carbon number of 250 or less. The alkane compound or alkene compound may be used in an amount of about 5 to about 1,000 parts by weight based on 100 parts by weight of the nanoparticle. When used within the range, it is possible to improve properties of the buffer layer by alleviating interface stress that the nanoparticle may experience.

The nanoparticle-resin composition is cured to obtain a nanoparticle-resin composite.

The nanoparticle-resin composition may further include a catalyst to promote a cross-linking reaction of the silicone resin including the reactive functional group.

Figure 2:
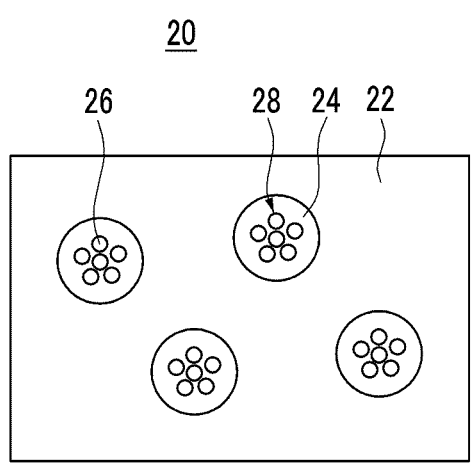
FIG. 2 is a schematic view of a nanoparticle-resin composite according to another embodiment.

The nanoparticle-resin composite is schematically illustrated in FIG. 2.

FIG. 2 is a schematic view of a nanoparticle-resin composite according to one embodiment. Referring to FIG. 2, the nanoparticle-resin composite 20 includes a silicone resin matrix 22 including a cure product of a silicone resin, a phase-separation domain 24 including a nanoparticle cluster 28 including a plurality of nanoparticles 26, and a buffer layer encapsulating the nanoparticle cluster 28. The buffer layer includes a compound selected from a silane group-containing compound, a silazane compound, or a combination comprising at least one of the foregoing, that is the same as described above.

The phase-separation domain 24 include a first portion contacting the nanoparticle cluster 26 and a second portion contacting the silicone resin matrix 22, and the compound selected from a silane group-containing compound, a silazane compound, or a combination comprising at least one of the foregoing may be present in a concentration gradient from the first portion to the second portion.

The compound selected from a silane group-containing compound, a silazane compound, or a combination thereof may be present so that a concentration ratio of the first and second portions has a mole ratio of about 1:5 to 20. When the concentration gradient is within the mole ratio, the interface between the nanoparticle and silicone resin may be effectively buffered to relieve stress.

The buffer layer may further include an alkane compound of C16 or more or an alkene compound of C16 or more. The alkane compound of C16 or more or the alkene compound of C16 or more is the same as described above.

The nanoparticle-resin composition 10 and nanoparticle-resin composite 20 may each stably maintain characteristics of the nanoparticles 16 and 26, and may be used for various applications. For example, the nanoparticle-resin composition 10 or the nanoparticle-resin composite 20 may be used in the fabrication of a light emitting diode, a memory device, a laser device, a photoelectric device, an organic photoelectric device, a solar cell, and the like. In addition, the nanoparticle-resin composition 10 and nanoparticle-resin composite 20 including a luminescent nanoparticle may be applied to a physiological field such as a bio application, and the like.

Figure 3:
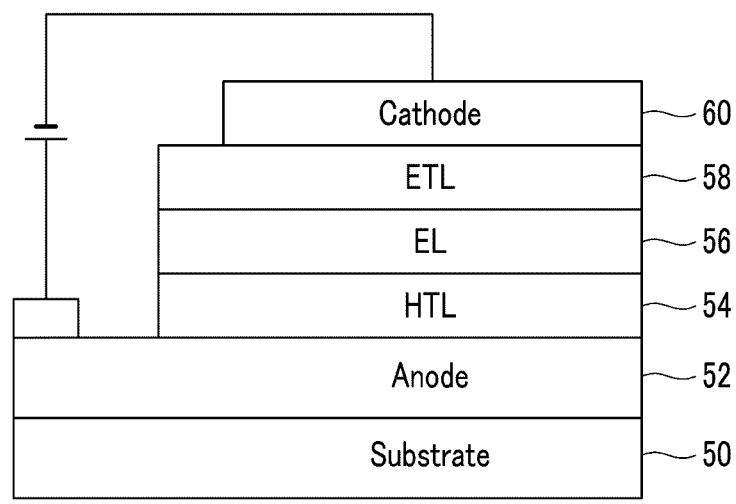
FIG. 3 is a cross-sectional view of a light emitting device including the nanoparticle-resin composition or nanoparticle-resin composite.

Referring to FIG. 3, illustrated is a current-driving light emitting device including the nanoparticle-resin composition 10 or nanoparticle-resin composite 20 as a light emitting material.

FIG. 3 is a cross-sectional view of a light emitting device including the nanoparticle-resin composition 10 and/or nanoparticle-resin composite 20.

A light emitting device of FIG. 3 includes an electroluminescent device. For example, an organic light emitting diode (OLED) may be exemplified. Generally, an OLED is fabricated by forming an emission layer between two electrodes, and injecting electrons and holes from the two electrodes into the organic emission layer to thereby produce excitons based on bonding between the electrons and holes. Light is generated when the excitons fall to a ground state from an excited state.

For example, as illustrated in FIG. 3, an OLED display device includes an anode 52 disposed on a surface of an organic substrate 50. The anode 52 may be formed of a material having a high work function so that the holes can be injected. Non-limiting examples of the material for forming the anode 20 include indium tin oxide ("ITO") and a transparent oxide of indium oxide. On a surface of the anode 52, a hole transport layer ("HTL") 54, an emission layer (EL) 56, and an electron transport layer (ETL) 58 are sequentially formed in a stacked structure as shown in FIG. 3. The hole transport layer 54 may include a p-type semiconductor, and the electron transport layer 50 may include an n-type semiconductor or a metal oxide. The emission layer 56 includes the nanoparticle-resin composition 10 or nanoparticle-resin composite 20.

A cathode 60 is formed on a surface of the electron transport layer 58 opposite that of the emission layer 56. The cathode 60 may be formed of a material having a low work function so that electrons can be easily injected into the electron transport layer 58. Examples of the material for forming the cathode 60 include a metal selected from the group consisting of magnesium, calcium, sodium, potassium, titanium, indium, yttrium, lithium, gadolinium, aluminum, silver, tin, lead, cesium, barium, alloys thereof, and a multi-layer structure material such as LiF/Al, $LiO_2$/Al, LiF/Ca, LiF/Al, and $BaF_2$/Ca, but are not limited thereto. Methods for fabricating the anode 52, the hole transport layer 54, the emission layer 56, the electron transport layer 58, and the cathode 60 and methods for assembling these layers are known to those skilled in the art, and as such, these methods will not be further described in detail in this specification.

Figure 4:
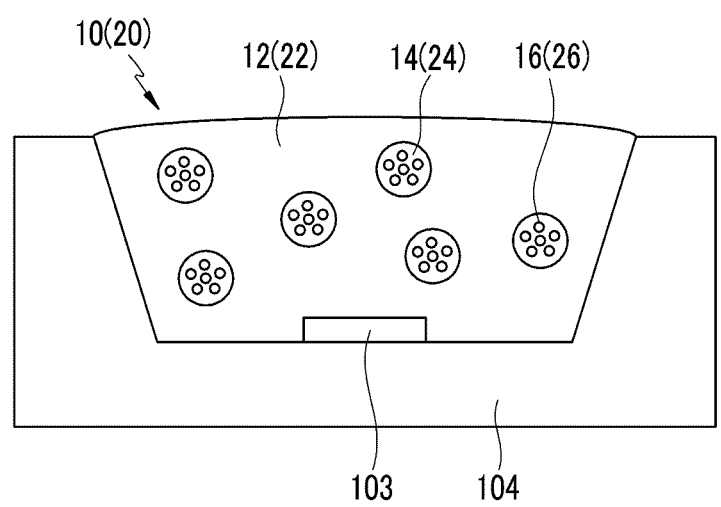
FIG. 4 is a cross-sectional view of a photo-conversion device including the nanoparticle-resin composition or nanoparticle-resin composite according to one embodiment.

Hereafter, a light emitting device according to an embodiment will be described. Referring to FIG. 4, a photoelectric device including the nanoparticle-resin composition 10 or nanoparticle-resin composite 20 as a light emitting material will be described as an example of the light emitting device.

FIG. 4 is a cross-sectional view of a photo-conversion device according to one embodiment.

The photo-conversion device includes a substrate 104 made of Ag and the like, a light emitting diode chip 103 taking a blue or ultraviolet ("UV") region on the substrate 104, and the nanoparticle-resin composition 10 or nanoparticle-resin composite 20. As shown in FIG. 4, the nanoparticle-resin composition 10 includes a mixed nanoparticle 16/phase-separation domain 14/resin 12 and the nanoparticle-resin composite 20 includes a combined nanoparticle 26-phase-separation domain 24-resin 22 on the light emitting diode chip 103

The nanoparticle 16 or 26 may be a red, green, or blue-emitting nanoparticle. The nanoparticle 16 or 26 (in the nanoparticle-resin compound 10 or nanoparticle-resin composite 20) is applied to and fills a recessed portion of the substrate 104 and covers the light emitting diode chip 103.

The nanoparticle 16 or 26 absorbs light emitting energy of the light emitting diode chip 103 and emits the excited energy as light with a different wavelength. The nanoparticle 16 or 26 may have variously-regulated light emitting wavelengths. For example, one white light emitting diode may be fabricated by combining red and green nano-complex particles with a blue light emitting diode chip. Alternatively, another white light emitting diode may be fabricated by combining red, green, and blue nano-complex particles with an ultraviolet (UV) light emitting diode chip. A light emitting diode emitting light of various wavelengths may be fabricated by nanoparticles emitting light with various wavelengths with a light emitting diode chip.

Hereinafter, the embodiments are illustrated in more detail with reference to examples. However, the following are exemplary embodiments and are not limiting.

SYNTHESIS EXAMPLE 1

Synthesis of InP/ZnS Semiconductor Nanocrystal 0.75 mmol of $In(OAc)_3$, 2.25 mmol of palmitic acid ("PA"), and 15 mL of 1-octadecene ("ODE") are agitated at 120° C. for one hour under vacuum, and 0.375 mmol of tris(trimethylsilyl)phosphine ("TMSP") is then injected thereinto under a nitrogen atmosphere, to prepare solution A. Similarly, 0.6 mmol of $In(OAc)_3$, 1.8 mmol of PA, and 30 mL of 1-octadecene are combined in a separate flask, the mixture is agitated at 120° C. for one hour under vacuum and then placed under a nitrogen atmosphere and heated to 280° C. Next, 0.3 mmol of TMSP is injected into the flask, and after 40 minutes, 11 mL of the solution A is added thereto in a dropwise fashion. Thirty minutes later, the resulting mixture is cooled to room temperature and then separated by addition of 35 mL acetone. The acetone solution is removed, and the separated InP product is dispersed in 2 mL of toluene. 0.6 mmol of $Zn(OAc)_2$, 1.2 mmol of oleic acid ("OA"), and 20 mL of trioctylamine ("TOA") are then combined in a separate flask, heated under vacuum at 120° C. and then placed under a nitrogen atmosphere and heated to 220° C. Then, the toluene solution of InP is injected thereinto, followed by 1.2 mmol of 0.4M S/TOP (a solution prepared by dissolving sulfur in trioctyl phosphine ("TOP")) is added thereto in a dropwise fashion. The mixture is reacted at 300° C. for one hour. The resulting product is cooled to room temperature and then separated with ethanol and dispersed in toluene, preparing InP/ZnS semiconductor nanocrystal having an InP core and a ZnS shell surrounding the InP core (quantum yield (QY): 54%).

EXAMPLE 1

Preparation of a Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 100 parts by weight of triethylsilane.

EXAMPLE 2

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 200 parts by weight of hexamethyldisilazane.

EXAMPLE 3

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4000 cps measured at 25° C.) and 400 parts by weight of hexamethyldisilazane.

EXAMPLE 4

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 200 parts by weight of nonamethyltrisilazane.

EXAMPLE 5

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 400 parts by weight of nonamethyltrisilazane.

EXAMPLE 6

Preparation of Nanoparticle-resin Composition

Example of Tetrasilazane 0.2 wt %

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 200 parts by weight of octyltricyclotetrasilazane.

EXAMPLE 7

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4,000 cps measured at 25° C.) and 400 parts by weight of octyltricyclotetrasilazane.

EXAMPLE 8

Preparation of Nanoparticle-resin Composition

A nanoparticle-resin composition is prepared by mixing 100 parts by weight of the InP/ZnS prepared according to Synthesis Example 1 with 1,000 parts by weight of poly (dimethylsiloxane) including a vinyl group (having a viscosity of 4000 cps measured at 25° C.) and 600 parts by weight of octyltricyclotetrasilazane.

Figure 5A:
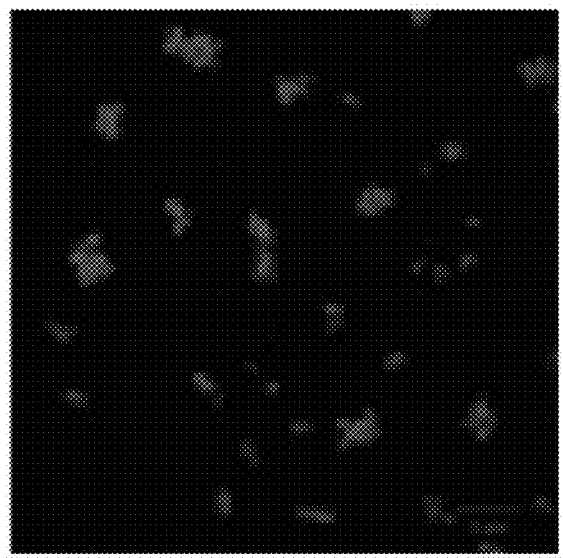
FIGS. 5A, 5B, and 5C are fluorescent microscope photographs of the nanoparticle-resin composites that are respectively obtained by curing the nanoparticle-resin compositions of Examples 2, 3, and 5, respectively.
Figure 5B:
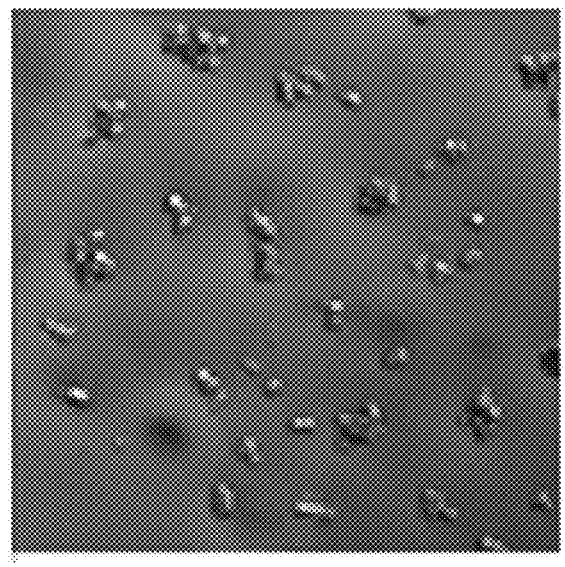
Figure 5C:
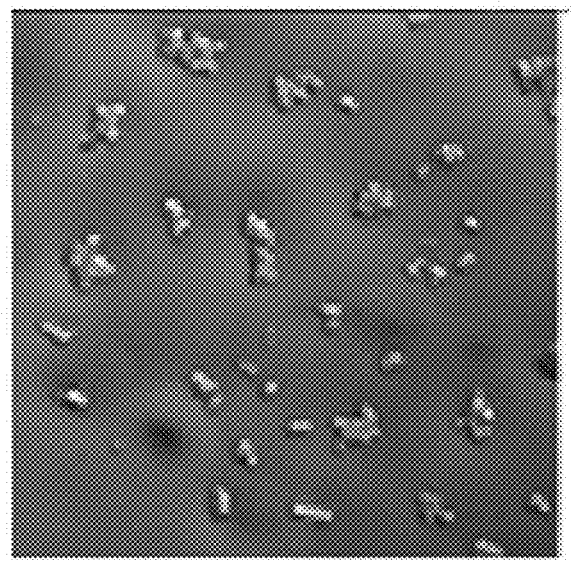
Figure 6A:
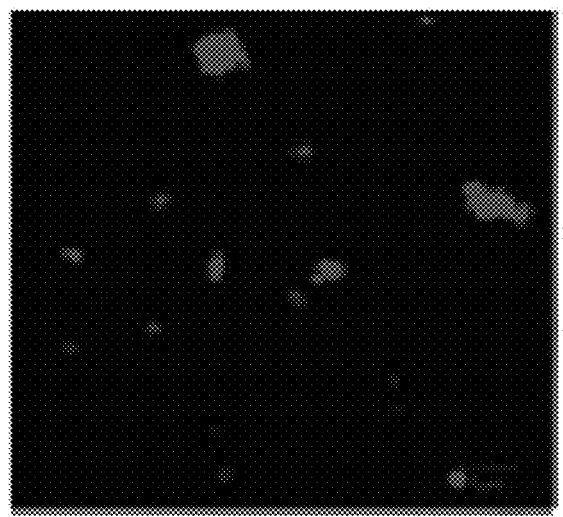
FIGS. 6A, 6B, and 6C are optical microscope photographs of the nanoparticle-resin composites that are respectively obtained by curing the nanoparticle-resin compositions of Examples 2, 3, and 5, respectively.
Figure 6B:
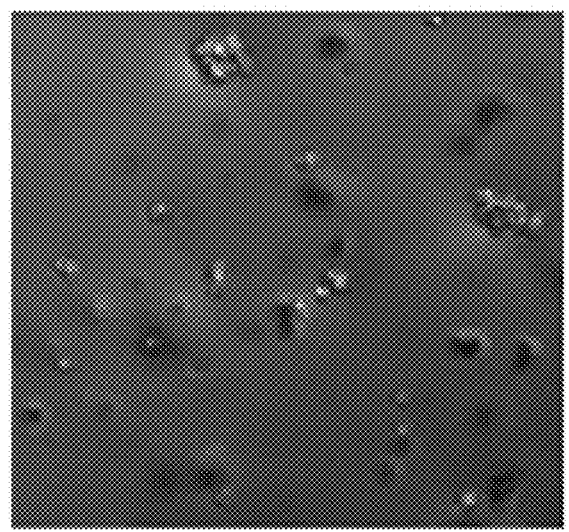
Figure 6C:
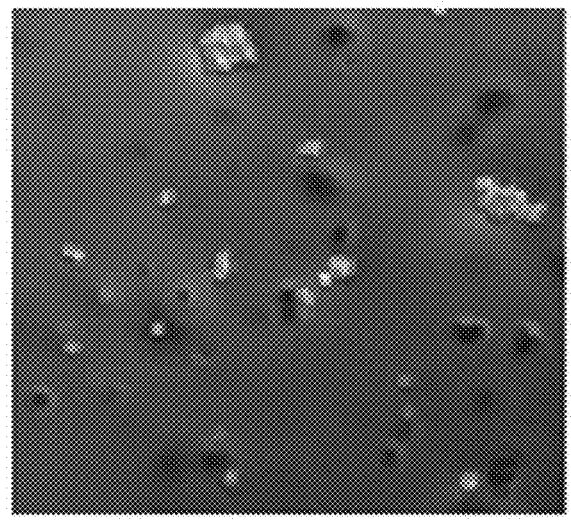
Figure 7A:
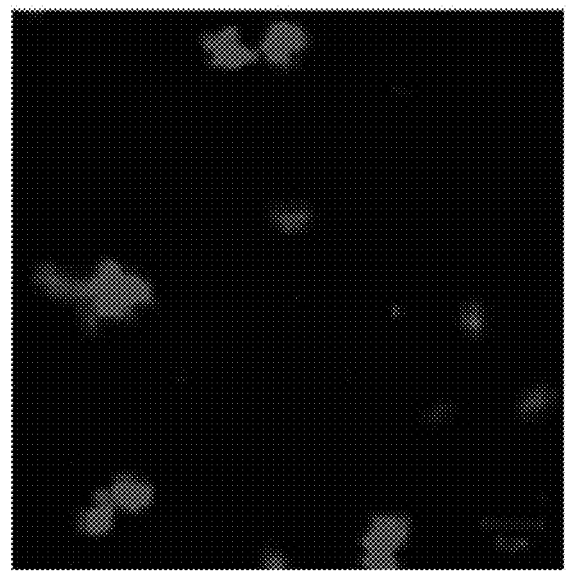
FIGS. 7A, 7B, and 7C are photographs that are obtained by overlapping the fluorescent microscope photographs of FIGS. 5A, 5B, and 5C and the optical microscope photographs FIG. 6A, FIG. 6B, and FIG. 6C, respectively.
Figure 7B:
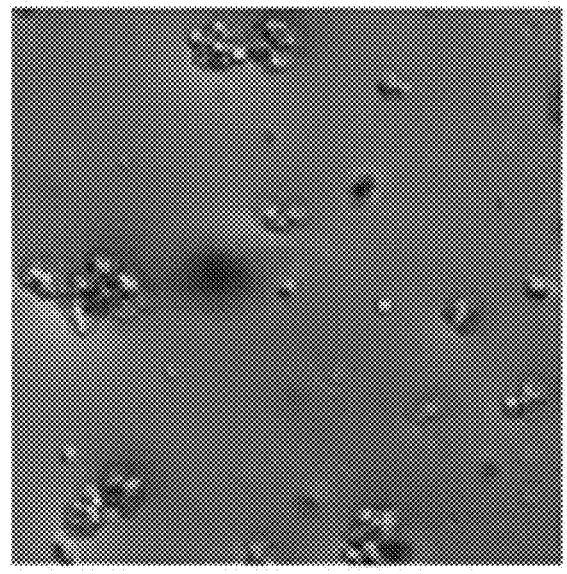
Figure 7C:
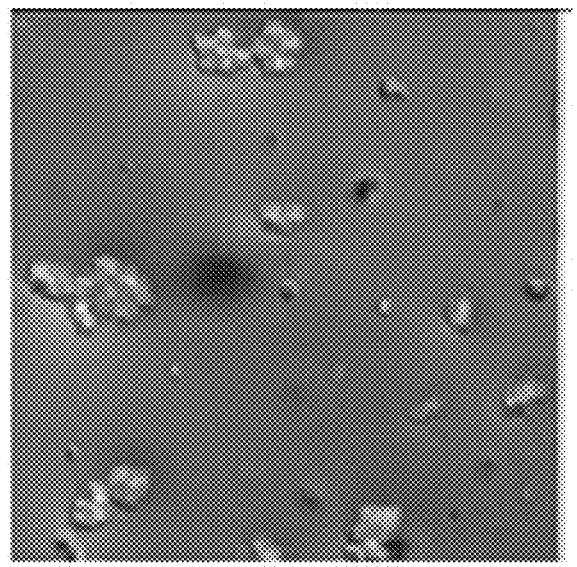

The nanoparticle-resin compositions according to Examples 2 to 8 are respectively cured at 150° C. to prepare the corresponding nanoparticle-resin composites. The nanoparticle-resin composites prepared from the nanoparticle-resin compositions of Examples 2, 3, and 5 were photographed with a fluorescent microscope, and the resulting photographs are shown in FIGS. 5A, 5B, and 5C, respectively. Optical microscope photographs of the cure products of Examples 2, 3, and 5 are shown in FIGS. 6A, 6B, and 6C respectively, and overlapped photographs thereof are provided in FIGS. 7A, 7B, and 7C, respectively. FIGS. 5A, 5B, and 5C each show the position of a nanoparticle cluster, while FIGS. 6A, 6B, and 6C show the position of a phase-separation domain. FIGS. 7A, 7B, and 7C show that the buffer layer is positioned where the nanoparticle cluster exists.

COMPARATIVE EXAMPLE 1

Preparation of Comparative Nanoparticle-resin Composition

A nanoparticle-resin composition is prepared by mixing 100 parts by weight of InP/ZnS prepared according to Synthesis Example 1 with 1,000 parts by weight of poly(dimethylsiloxane including a vinyl group (having a viscosity of 4000 cps measured at 25° C.).

EXAMPLES 9 to 15

Fabrication of Light Emitting Diode (LED)

A circuit board is equipped with an Ag frame and a light emitting diode chip emitting in the blue region of the spectrum at 445 nm in a recessed portion of the circuit board. The nanoparticle-resin compositions prepared according to Examples 2 to 8 are coated to cover the Ag frame and the light emitting diode chip in the recess portion respectively in an amount of 5 µl and placed in a 150° C. oven for two hours, thereby fabricating a light emitting diode which includes the nanoparticle-resin composite. The light emitting diodes of Examples 9 to 15 correspond to the nanoparticle-resin compositions of Examples 2 to 8, respectively.

COMPARATIVE EXAMPLE 2

Fabrication of Light Emitting Diode (LED)

A light emitting diode is fabricated according to the same method as Examples 6 and 13 except that the nanoparticle-resin composition used is that of Comparative Example 1 instead of Example 6.

The light emitting diodes according to Examples 9 to 15 and Comparative Example 2 are operated with a current of 60 mA and luminous efficiency and external quantum efficiency ("EQE") are measured for each example and comparative example. Each data point was acquired by calculating the average of a set of 5 samples of each of Examples 9 to 15 and calculating the statistical average for each set. The following Table 1 shows the measurement results of Examples 10, 11, and 14 and Comparative Example 2.

TABLE 1

|  | Example 10 | Example 11 | Example 14 | Comparative Example 2 |
|---|---|---|---|---|
| Luminous efficiency (lm/W) | 10.63 | 11.67 | 11.97 | 9.03 |
| (standard deviation) | 0.14 | 0.71 | 0.9 | 0.27 |
| EQE (%) | 15.2 | 17.06 | 17.37 | 11.66 |
| (standard deviation) | 0.52 | 1.44 | 1.65 | 0.42 |

As shown in Table 1, the light emitting diodes of Examples 10, 11, and 14 (which correspond to nanoparticle-resin composites prepared from Examples 3, 4, and 7, respectively) each have higher luminous efficiency (where the examples are 1.6-2.9 lm/W higher in luminous efficiency) and quantum efficiency (where the examples are 3.54-5.71% higher in EQE) when compared with that of Comparative Example 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A nanoparticle-resin composition comprising:
    a nanoparticle comprising a semiconductor nanoparticle, wherein the semiconductor nanoparticle is selected from a group II-VI compound, a group III-V compound, a group IV-VI compound, a group IV compound, or a combination comprising at least one of the foregoing compounds;
    a silicone resin having a reactive functional group at its terminal end; and
    a compound selected from a silane group-containing compound, a silazane compound, or a combination comprising at least one of the foregoing compounds, wherein the compound forms a domain as being phase-separated from the silicone resin and the nanoparticle is dispersed in the domain;
    wherein the silane group-containing compound is represented by the following Chemical Formula 2:

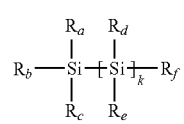

Chemical Formula 2 wherein, the Chemical Formula 2,
    $R_a$ to $R_f$ is selected from hydrogen, a substituted or unsubstituted C1 to C30 alkyl group, a substituted or unsubstituted C6 to C30 aryl group, or a substituted or unsubstituted C6 to C30 heteroaryl group, provided that at least one of $R_a$ to $R_f$ is hydrogen; and
    k is an integar of from 0 to 5,
    wherein the silazane compound is represented by the following Chemical Formula 3:

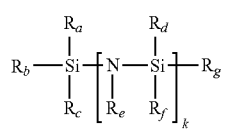

Chemical Formula 3 wherein, in Chemical Formula 3, $R_a$ to $R_g$ is selected from hydrogen, a substituted or unsubstituted C1 to C30 alkyl group, a substituted or unsubstituted C1 to C30 alkoxy group, a substituted or unsubstitutted C6 to C30 aryl group, and a substituted or unsubstituted C6 to C30 heteroaryl group, or NR, where R is hydrogen or a C1 to C10 alkyl group;

k is an integer of from 1 to 10; and when k is 4 or more, $R_b$ and $R_g$ are linked to each other to form a ring, and wherein the compound selected from a silane group-containing compound, a silazane compound, or a combination thereof is included in an amount of about 100 to about 1,000 parts by weight based on 100 parts by weight of the nanoparticle.

2. The nanoparticle-resin composition of claim 1, wherein the nanoparticle further comprises a metal nanoparticle, a metal oxide nanoparticle, or a combination comprising at least one of the foregoing compounds.

3. The nanoparticle-resin composition of claim 2, wherein the metal nanoparticle is selected from palladium, platinum, nickel, cobalt, rhodium, iridium, iron, ruthenium, gold, silver, copper, or a combination comprising at least one of the foregoing compounds.

4. The nanoparticle-resin composition of claim 2, wherein the metal oxide nanoparticle comprises oxides of a metal selected from silicon, titanium, cobalt, tin, aluminum, zinc, indium, zirconium, nickel, hafnium, vanadium, or a combination comprising at least one of the foregoing compounds.

5. The nanoparticle-resin composition of claim 1, wherein the silicone resin having a reactive functional group at its terminal end is represented by the following Chemical Formula 1:

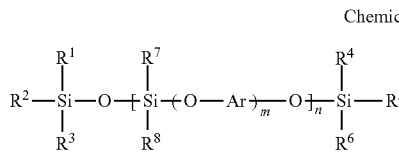

Chemical Formula 1 wherein, in Chemical Formula 1, $R^1$ to $R^6$ are the same or different, and are selected from hydrogen, a substituted or unsubstituted C1 to C30 alkyl group, a substituted or unsubstituted C6 to C30 aryl group, a substituted or unsubstituted C6 to C30 heteroaryl group, a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth)acrylate, a halogen, —ROR' wherein R is a substituted or unsubstituted C1 to C30 alkylene group, and R' is hydrogen or a C1 to C30 alkyl group, an acyl halide, —RCOX wherein R is a substituted or unsubstituted C1 to C30 alkylene group and X is a halogen, or —RCOOR' wherein R is a substituted or unsubstituted C1 to C30 alkylene group, or R' is hydrogen or a C1 to C30 alkyl group, provided at least one of $R^1$ to $R^3$ and at least one of $R^4$ to $R^6$ are selected from a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$; a substituted or unsubstituted C1 to C30 amine group, an isocyanate, a (meth)acrylate, a halogen, —ROR' wherein R is a substituted or unsubstituted C1 to C30 alkylene group and R' is hydrogen or a C1 to C30 alkyl group, an acyl halide, —RCOX wherein R is a substituted or unsubstituted C1 to C30 alkylene group and X is a halogen), or —RCOOR' wherein R is a substituted or unsubstituted alkylene group, and R' is hydrogen or a C1 to C30 alkyl group;

$R^7$ and $R^8$ are the same or different, and are selected from hydrogen, a substituted or unsubstituted C1 to C30 alkyl group, a substituted or unsubstituted C6 to C30 aryl group, or a substituted or unsubstituted C6 to C30 heteroaryl group;

Ar is selected from a substituted or unsubstituted C6 to C30 arylene group or a substituted or unsubstituted C6 to C30 heteroarylene group;

m is 0 or 1; and n is an integer of from 2 to 30.

6. The nanoparticle-resin composition of claim 1, wherein the silicone resin having a reactive functional group at its terminal end has a viscosity of from about 10 to about 20,000 cps.

7. The nanoparticle-resin composition of claim 1, wherein the nanoparticle-resin composition further comprises an alkane compound of C16 or more or an alkene compound of C16 or more.

8. A nanoparticle-resin composite comprising:
a silicone resin matrix comprising a cure product of a silicone resin having a reactive functional group at its terminal end;
a plurality of nanoparticle clusters dispersed in the silicone resin matrix, the nanoparticle cluster including a plurality of nanoparticles; and
a buffer layer encapsulating the nanoparticle cluster,
wherein the nanoparticle comprises a semiconductor nanoparticle and the semiconductor nanoparticle is selected from a group II-VI compound, a group III-V compound, a group IV-VI compound, a group IV compound, or a combination comprising at least one of the foregoing compounds, and
wherein the buffer layer comprises a compound selected from a silane group-containing compound, a silazane compound, or a combination comprising at least one of the foregoing compounds, wherein the silane group-containing compound is represented by the following Chemical Formula 2:

Chemical Formula 2

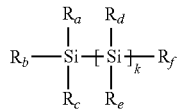

wherein, in Chemical Formula 2, $R_a$ to $R_f$ is selected hydrogen, a substituted or unsubstituted C1 to C30 alkyl group, a substituted or unsubstituted C6 to C30 aryl group, or a substituted or unsubstituedd C6 to C30 heteroaryl group, provided that at least one of $R_a$ to $R_f$ is hydrogen; and k is an integer of from 0 to 5, wherein the silazane compound is represented by the following Chemical Formula 3:

Chemical Formula 3

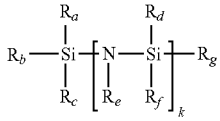

wherein, in Chemical Formula 3, $R_a$ to $R_g$ is selected from hydrogen, a substituted or unsubstituted C1 to C30 alkyl group, a substituted or unsubstituted C1 to C30 alkoxy group, a substituted or unsubstituted C6 to C30 aryl group, and a substituted or unsubstituted C6 to C30 heteroaryl group, or NR, where R is hydrogen or a C1 to C10 alkyl group;

k is an integer of from 1 to 10; and when k is 4 or more, $R_b$ and $R_g$ are linked to each other to form a ring, and wherein the compound selected from a silane group-containing compound, a silazane compound, or a combination thereof is included in an amount of about 100 to about 1,000 parts by weight based on 100 parts by weight of the nanoparticle.

9. The nanoparticle-resin composite of claim 8, wherein the nanoparticle futher comprises a metal nanoparticle, a metal oxide nanoparticle, or a combination comprising at least one of the foregoing compounds.

10. The nanoparticle-resin composite of claim 9, wherein the metal nanoparticle is selected from palladium, platinum, nickel, cobalt, rhodium, iridium, iron, ruthenium, gold, silver, copper, or a combination comprising at least one of the foregoing compounds.

11. The nanoparticle-resin composite of claim 9, wherein the metal oxide nanoparticle comprises oxides of a metal selected from silicon, titanium, cobalt, tin, aluminum, zinc, indium, zirconium, nickel, hafnium, vanadium, or a combination comprising at least one of the foregoing compounds.

12. The nanoparticle-resin composite of claim 8, wherein the silicone resin having a reactive functional group at its terminal end is represented by the following Chemical Formula 1:

Chemical Formula 1

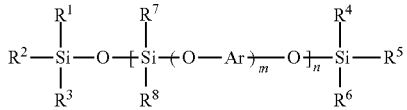

wherein, in Chemical Formula 1, $R^1$ to $R^6$ are the same or different, and are selected from hydrogen; a substituted or unsubstituted C1 to C30 alkyl group, a substituted or unsubstituted C6 to C30 aryl group, a substituted or unsubstituted C6 to C30 heteroaryl group, a substituted or unsubstituted C2 to C30 alkenyl group, a substituted or unsubstituted C2 to C30 alkynyl group, a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth)acrylate, a halogen, —ROR' wherein R is a substituted or unsubstituted C1 to C30 alkylene group, and R' is hydrogen or a C1 to C30 alkyl group, an acyl halide, —RCOX wherein R is a substituted or unsubstituted C1 to C30 alkylene group and X is a halogen, or —RCOOR' wherein R is a substituted or unsubstituted C1 to C30 alkylene group, or R' is hydrogen or a C1 to C30 alkyl group, provided at least one of $R^1$ to $R^3$ and at least one of $R^4$ to $R^6$ are selected from a substituted or unsubstituted C2 to C30 alkenyl group a substituted or unsubstituted C2 to C30 alkynyl group a substituted or unsubstituted C3 to C30 alicyclic group including a double bond or a triple bond in its ring, a substituted or unsubstituted C3 to C30 heterocycloalkyl group including a double bond or a triple bond in its ring, a C3 to C30 alicyclic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, a thiol group, $NH_2$, a substituted or unsubstituted C1 to C30 amine group, an isocyanate, a (meth)acrylate, a halogen, —ROR' wherein R is a substituted or unsubstituted C1 to C30 alkylene group and R' is hydrogen or a C1 to C30 alkyl group, an acyl halide, —RCOX wherein R is a substituted or unsubstituted C1 to C30 alkylene group and X is a halogen, or —RCOOR' wherein R is a substituted or unsubstituted C1 to C30 alkylene group, and R' is hydrogen or a C1 to C30 alkyl group;

$R^7$ and $R^8$ are the same or different, and are selected from hydrogen, a substituted or unsubstituted C1 to C30 alkyl group, a substituted or unsubstituted C6 to C30 aryl group, or a substituted or unsubstituted C6 to C30 heteroaryl group;

Ar is selected from a substituted or unsubstituted C6 to C30 arylene group or a substituted or unsubstituted C6 to C30 heteroarylene group;

m is 0 or 1; and n is an integer of from 2 to 30.

13. The nanoparticle-resin composite of claim 8, wherein the silicone resin having a reactive functional group at its terminal end has a viscosity of from about 10 to about 20,000 cps.

14. The nanoparticle-resin composite of claim 8, wherein the buffer layer comprises a first portion contacting the nanoparticle cluster and a second portion contacting the silicone resin matrix, and the compound selected from a silane group-containing compound, a silazane compound, or a combination comprising at least one of the foregoing compounds is present in a concentration gradient from the first portion to the second portion.

15. The nanoparticle-resin composite of claim 8, wherein the buffer layer further comprises an alkane compound of C16 or more or an alkene compound of C16 or more.

* * * * *